US012793702B2

(12) United States Patent
Meng

(10) Patent No.: US 12,793,702 B2
(45) Date of Patent: Nov. 10, 2026

(54) TRAINING A SPEECH RECOGNITION MODEL, AND SPEECH RECOGNITION

(71) Applicant: Mashang Consumer Finance Co., Ltd., Chongqing (CN)

(72) Inventor: Qinglin Meng, Chongqing (CN)

(73) Assignee: Mashang Consumer Finance Co., Ltd., Chongqing (CN)

( * ) Notice: Subject to any disclaimer, the term of this patent is extended or adjusted under 35 U.S.C. 154(b) by 134 days.

(21) Appl. No.: 18/814,675

(22) Filed: Aug. 26, 2024

(65) Prior Publication Data

US 2025/0273200 A1 Aug. 28, 2025

(30) Foreign Application Priority Data

Feb. 27, 2024 (CN) ......................... 202410218041.1

(51) Int. Cl.

| | |
|---|---|
| ***G10L 15/06*** | (2013.01) |
| ***G10L 15/02*** | (2006.01) |
| ***G10L 15/04*** | (2013.01) |
| ***G10L 15/18*** | (2013.01) |
| ***G10L 25/84*** | (2013.01) |

(52) U.S. Cl.

CPC ............ *G10L 15/063* (2013.01); *G10L 15/02* (2013.01); *G10L 15/04* (2013.01); *G10L 15/1815* (2013.01); *G10L 25/84* (2013.01)

(58) Field of Classification Search

CPC ....... G10L 15/063; G10L 15/02; G10L 15/04; G10L 15/1815; G10L 25/84

See application file for complete search history.

(56) References Cited

U.S. PATENT DOCUMENTS

2022/0172707 A1* 6/2022 Wang ...................... G10L 15/02

FOREIGN PATENT DOCUMENTS

| | | | | |
|---|---|---|---|---|
| CN | 114360502 A | * | 4/2022 | |
| CN | 117275498 A | * | 12/2023 | G10L 21/007 |
| CN | 117437904 A | * | 1/2024 | G10L 15/02 |

* cited by examiner

*Primary Examiner* — Yogeshkumar Patel

(57) ABSTRACT

A method for training a speech recognition model includes: performing, by the speech recognition model, feature extraction on a speech sample to obtain a speech sample feature; performing semantic extraction on the speech sample feature to obtain a semantic feature of the speech sample; determining a first loss value based on the semantic feature; performing, by the speech recognition model, speech recognition on the speech sample based on the speech sample feature to obtain a speech sample recognition result; determining a second loss value based on the speech sample recognition result and a speech sample label corresponding to the speech sample; and training the speech recognition model based on the first loss value and the second loss value to obtain a trained speech recognition model.

19 Claims, 3 Drawing Sheets

TRAINING A SPEECH RECOGNITION MODEL, AND SPEECH RECOGNITION

CROSS-REFERENCE TO RELATED APPLICATION

This application claims the benefit of priority of Chinese Patent Application No. 202410218041.1, filed on Feb. 27, 2024, the disclosure of which is incorporated herein by reference in its entirety.

TECHNICAL FIELD

The present disclosure relates to computer technologies, and more particularly, to training of a speech recognition model, and speech recognition.

BACKGROUND

Artificial Intelligence (AI) may involve a wide range of fields and both hardware and software technologies. The basic technologies for Artificial Intelligence generally include, for example, sensors, dedicated artificial intelligence chips, cloud computing, distributed storage, big data processing technologies, pre-trained model technologies, operation/interaction systems, mechatronics, and the like. The pre-trained model is also called a large model or a basic model and, after subject to fine adjustment, can be widely applied to downstream tasks in various aspects of artificial intelligence. Artificial intelligence software technologies mainly include computer vision technology, speech processing technology, natural language processing technology, machine learning/deep learning, and the like.

Generally, in order to obtain a trained speech recognition model, an initial speech recognition model is used to perform speech recognition on speech samples to obtain speech recognition results that are then directly used to determine loss values, and the initial speech recognition model is trained by using the loss values to obtain the trained speech recognition model. In this way, since the speech samples may have broad semantic expressions, the trained speech recognition model cannot capture semantic information effectively and thus has a poor recognition performance.

SUMMARY

According to one or more embodiments of the present disclosure, a method for training a speech recognition model includes: performing, by an initial speech recognition model, feature extraction on a speech sample to obtain a speech sample feature; performing semantic extraction on the speech sample feature to obtain a semantic feature of the speech sample; determining a first loss value based on the semantic feature; performing, by the initial speech recognition model, speech recognition on the speech sample based on the speech sample feature to obtain a speech recognition result; determining a second loss value based on the speech recognition result and a speech sample label corresponding to the speech sample; and training the initial speech recognition model based on the first loss value and the second loss value to obtain the speech recognition model.

According to one or more embodiments of the present disclosure, a speech recognition method includes: performing, by a speech recognition model, feature extraction on speech data to obtain a speech feature; and performing, by the speech recognition model, speech recognition on the speech data based on the speech feature to obtain a speech recognition result corresponding to the speech data. The speech recognition model is obtained by training an initial speech recognition model based on a semantic feature of a speech sample.

According to one or more embodiments of the present disclosure, an electronic device includes: a processor; and a memory storing an application program executable by the processor to perform the method of any one of the methods.

DETAILED DESCRIPTION

Figure 1:
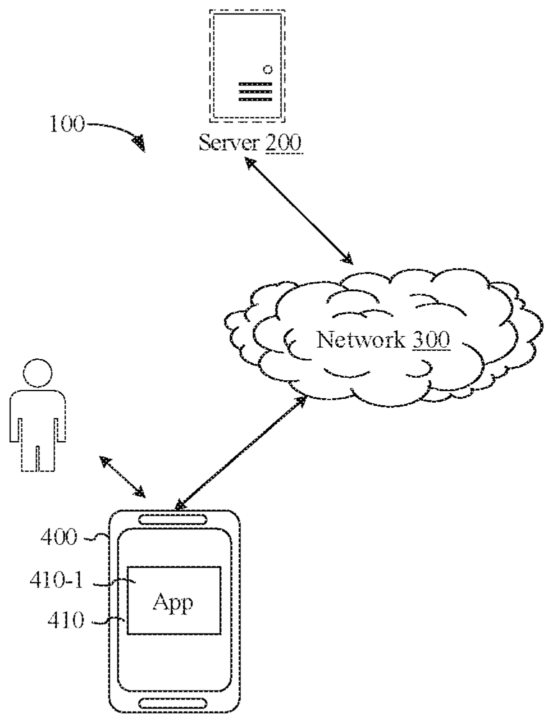
FIG. 1 is a schematic diagram of an architecture of a speech recognition system according to one or more embodiments of the present disclosure.

Some embodiments of the present disclosure will be described in detail below with reference to the accompanying drawings. The embodiments are described for illustrative purposes only and are not intended to limit the present disclosure.

In the following description, reference is made to "some embodiments", which describe a subset of all possible embodiments. However, it is to be understood that "some embodiments" can be same of different subsets of all possible embodiments, and can be combined with each other without conflict.

In the following description, the reference to the term "first/second/third" is merely for distinguishing similar objects and does not represent a specific ordering for the objects. It is to be understood that the specific order or sequence of "first/second/third" can be interchanged where allowed, so that the embodiments described herein can be implemented in an order other than that illustrated or described herein.

Unless defined otherwise, all technical and scientific terms used herein have the same meaning as those commonly understood by one of ordinary skill in the art to which the present disclosure belongs. The terms used herein is for the purpose of describing embodiments of the present disclosure only and is not intended to limit the present disclosure.

Before the embodiments of the present disclosure are described in further detail, the nouns and terms involved in the embodiments of the present disclosure are described, and are applicable to the following explanations.

1) Artificial Intelligence (AI): Artificial Intelligence is a comprehensive discipline involving a wide range of fields and including both hardware and software technologies. The basic technologies of Artificial Intelligence generally include, for example, sensors, dedicated artificial intelligence chips, cloud computing, distributed storage, big data processing technologies, pre-training model technologies, operation/interaction systems, mechatronics, and the like. The pre-training model is also called a large model or a basic model, and can be widely applied to downstream tasks in various aspects of artificial intelligence after fine adjustment. Artificial intelligence software technology mainly includes computer vision technology, speech processing technology, natural language processing technology and machine learning/deep learning.

2) A Convolution Neural Network (CNN): The Convolution Neural Network is a type of Feed Forward Neural Network (FNN) including a convolution calculation and having a depth structure, and is one of the representative algorithms for Deep Learning. The Convolutional Neural Network has an ability of Representation Learning to perform Shift-Invariant Classification on input images based on their hierarchical structure.

3) Speech recognition: Speech recognition is an interdisciplinary subject, an involves the fields such as signal processing, pattern recognition, probability theory and information theory, vocalizational principle and auditory principle, and the like. Speech recognition is a high technology that allows a machine to transform a speech signal into a corresponding text or command through a process of recognition and understanding. Speech recognition mainly includes three aspects: feature extraction technology, pattern matching rule and model training technology.

4) Machine Learning (ML): Machine Learning is a multi-field interdisciplinary discipline which involves multiple disciplines such as probability theory, statistics, approximation theory, convex analysis, algorithm complexity theory and the like, and is dedicated to study how a computer simulates or implements human learning behavior in order to obtain new knowledge or skills, and to reorganize existing knowledge structures to continuously improve its own performance. Machine learning is the core of Artificial Intelligence and a fundamental way to make a computer intelligent, and is applicable to all fields of artificial intelligence. Machine learning and deep learning generally include technologies such as artificial neural networks, confidence networks, reinforcement learning, transfer learning, inductive learning, Learning from Demonstration, and the like.

5) End-to-end speech recognition: The object of speech recognition is to convert the lexical content in human speech into text content. End-to-end speech recognition uses a pure neural network, replacing a general mixed method for training a general alignment model, acoustic model, language model, and the like.

6) Transformer: Transformer is a timing model based on the self-attention mechanism, can effectively encode the timing information in the Conformer part, and has a processing capability of the timing information much better than the Long Short-Term Memory (LSTM) and a high speed. It is widely used in the fields of natural language processing, computer vision, machine translation, speech recognition, and the like.

7) Conformer: Conformer combines Transformer and CNN. The Transformer model is good at capturing content-based global interactions, while CNN effectively takes advantage of local features. Thus, the model has good modeling for long-time global interaction information and local features.

8) Connectionist Temporal Classification (CTC): CTC is a loss function in the sequence labeling problem. A general sequence labeling algorithm requires that the input symbol and output symbols are completely aligned at each moment. CTC expands a label set and adds an empty element. After the sequence is labelled with an extended label set, all prediction sequences that can be converted into a real sequence by a mapping function are correct predictions. That is, the prediction sequence can be obtained without data alignment processing.

According to one or more embodiments of the present disclosure, a method for training a speech recognition model, a speech recognition method, a device, an electronic apparatus, and a computer readable storage medium is provided, so that the recognition performance of the speech recognition model can be effectively improved. An exemplary application of the speech recognition system provided in one or more embodiments of the present disclosure is described as follows.

FIG. 1 is a schematic diagram of an architecture of a speech recognition system according to one or more embodiments of the present disclosure. A terminal (a terminal 400 is illustrated) is connected to a server 200 through a network 300, which may be a wide area network or a local area network, or a combination of both.

The terminal 400 is used for a user to display speech recognition results in a graphical interface 410-1 (the graphical interface 410-1 is illustrated) using the client 410. The terminal 400 and the server 200 are connected to each other through a wired or wireless network.

In one or more embodiments, the server 200 may be a stand-alone physical server, may be a server cluster or a distributed system of multiple physical servers, or may be a cloud server providing basic cloud computing services such as cloud services, cloud databases, cloud computing, cloud functions, cloud storage, network services, cloud communications, middleware services, domain name services, security services, Content Delivery Network (CDN), and big data and artificial intelligence platforms. The terminal 400 may be, but is not limited to, a smartphone, a tablet computer, a notebook computer, a desktop computer, a smart speaker, a smart television, a smart watch, an in-vehicle terminal, or the like. The electronic apparatus provided in one or more embodiments of the present disclosure may be implemented as a terminal or a server. The terminal and the server may be directly or indirectly connected through wired or wireless communication, which is not limited in one or more embodiments of the present disclosure.

In one or more embodiments, the server 200 performs feature extraction on the a speech sample through the initial speech recognition model to obtain a speech sample feature, performs speech recognition on the speech sample based on the speech sample feature through the initial speech recognition model to obtain a speech recognition result, trains the initial speech recognition model based on the speech recognition result and the speech sample feature to obtain a speech recognition model, and sends the speech recognition model to the terminal 400.

In other one or more embodiments, the terminal 400 performs feature extraction on the speech sample through the initial speech recognition model to obtain the speech sample feature, performs speech recognition on the speech sample based on the speech sample feature through the initial speech recognition model to obtain the speech recognition result, trains the initial speech recognition model based on the speech recognition result and the speech sample feature to obtain the speech recognition model, and sends the speech recognition model to the server 200.

In other one or more embodiments, one or more embodiments of the present disclosure may be implemented by means of Cloud Technology, which refers to a host technology that unifies a series of resources, such as hardware, software, and network, within a wide area network or a local area network to implement calculation, storage, processing, and sharing of data.

Cloud technology is a general term of network technology, information technology, integration technology, management platform technology, application technology, and the like that are applied based on a cloud computing business model, and can form a resource pool, which can be used as required and is flexible and convenient. Cloud computing technology will become an important support. Background services of a technical network system require a large amount of computing and storage resources.

Figure 2:
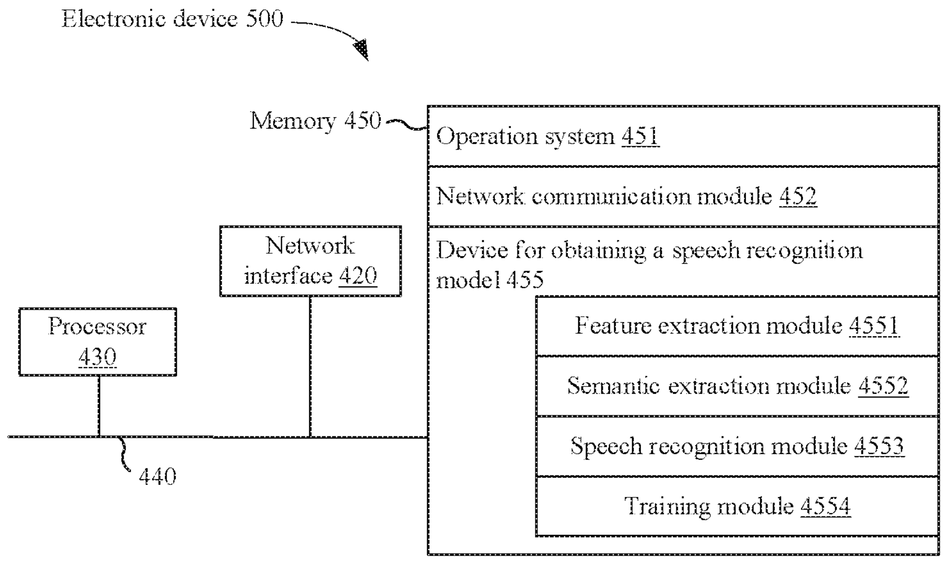
FIG. 2 is a schematic block diagram of an electronic device for training a speech recognition model according to one or more embodiments of the present disclosure.

FIG. 2 is a block diagram of an electronic device for training a speech recognition model according to one or more embodiments of the present disclosure. The electronic device 500 shown in FIG. 2 may be the server 200 or the terminal 400 in FIG. 1. The electronic device 500 shown in FIG. 2 includes at least one processor 430, a memory 450, and at least one network interface 420. The various components in the electronic device 500 are coupled together through a bus system 440. It will be appreciated that the bus system 440 is used to implement connection communication between these components. The bus system 440 includes, in addition to a data bus, a power bus, a control bus, and a status signal bus. For clarity of illustration, however, various buses are labeled as the bus system 440 in FIG. 2.

The processor 430 may be an integrated circuit chip having a signal processing ability, such as a general purpose processor, a Digital Signal Processor (DSP), or another programmable logic device, a discrete gate or transistor logic device, a discrete hardware component, and the like. The general purpose processor may be a microprocessor or any general processor, and the like.

Memory 450 may be removable, non-removable, or a combination thereof. Exemplary hardware devices include solid state memory, hard disk drive, optical disk drive, and the like. Memory 450 optionally includes one or more storage devices that are physically away from the processor 430.

The memory 450 includes either volatile memory or non-volatile memory, and may also include both volatile memory and non-volatile memory. The non-volatile memory may be a Read Only Memory (ROM), and the volatile memory may be a Random Access Memory (RAM). The memory 450 described in one or more embodiments of the present disclosure is intended to include any suitable type of memory.

In one or more embodiments, the memory 450 can store data to support various operations. The examples of the data include programs, modules, and data structures or subsets or supersets thereof, as explained below.

An operating system 451 includes a system program for processing various basic system services and performing hardware-related tasks, such as a framework layer, a core library layer, a drive layer, and the like, for implementing various basic services and processing hardware-based tasks;

A network communication module 452 is used for reaching other electronic devices via one or more (wired or wireless) network interfaces 420, examples of which include Bluetooth, Wireless Fidelity (WiFi), and Universal Serial Bus (USB), and the like.

In one or more embodiments, the device for training the speech recognition model provided in one or more embodiments of the present disclosure may be implemented in software. FIG. 2 shows the device 455 for training the speech recognition model stored in the memory 450, which may be software in the form of programs and plug-ins, including the following software modules: a feature extraction module 4551, a semantic extraction module 4552, a speech recognition module 4553, and a training module 4554. These modules are logical to be combined or further split based on the implemented functions. The functions of the various modules will be described below.

Figure 3:
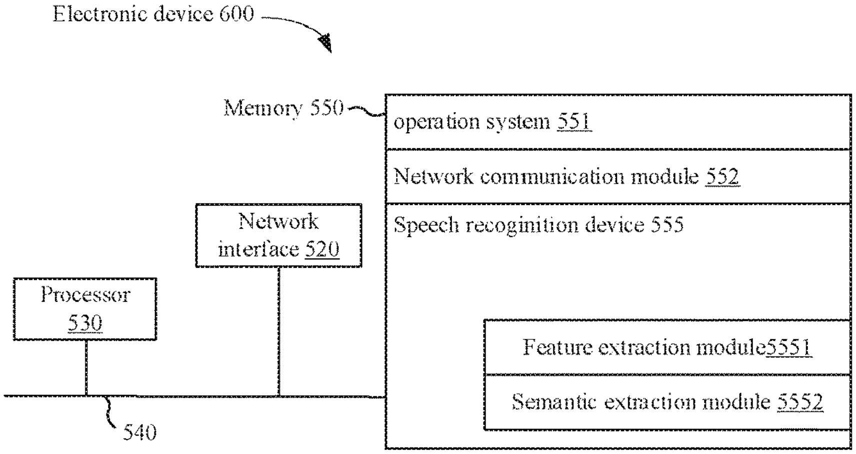
FIG. 3 is a schematic block diagram of an electronic device for speech recognition according to one or more embodiments of the present disclosure.

FIG. 3 is a block diagram of an electronic device for speech recognition according to one or more embodiments of the present disclosure. The electronic device 600 shown in FIG. 3 may be the server 200 or the terminal 400 in FIG. 1. The electronic device 600 shown in FIG. 3 includes at least one processor 530, a memory 550, and at least one network interface 520. The various components in the electronic device 600 are coupled together through a bus system 540. It will be appreciated that the bus system 540 is used to implement connection communication between these components. The bus system 540 includes, in addition to a data bus, a power bus, a control bus, and a status signal bus. For clarity of illustration, however, various buses are labeled as the bus system 540 in FIG. 3.

The processor 530 may be an integrated circuit chip having a signal processing ability, such as a general purpose processor, a Digital Signal Processor (DSP), or another programmable logic device, a discrete gate or transistor logic device, a discrete hardware component, and the like. The general purpose processor may be a microprocessor or any general processor, and the like.

Memory 550 may be removable, non-removable, or a combination thereof. Exemplary hardware devices include solid state memory, hard disk drive, optical disk drive, and the like. Memory 550 optionally includes one or more storage devices that are physically away from the processor 530.

The memory 550 includes either volatile memory or non-volatile memory, and may also include both volatile memory and non-volatile memory. The non-volatile memory may be a Read Only Memory (ROM), and the volatile memory may be a Random Access Memory (RAM). The memory 550 described in one or more embodiments of the present disclosure is intended to include any suitable type of memory.

In one or more embodiments, the memory 550 can store data to support various operations. The examples of the data include programs, modules, and data structures or subsets or supersets thereof, as explained below.

An operating system 551 includes a system program for processing various basic system services and performing hardware-related tasks, such as a framework layer, a core library layer, a drive layer, and the like, for implementing various basic services and processing hardware-based tasks;

A network communication module 552 is used for reaching other electronic devices via one or more (wired or wireless) network interfaces 520, examples of which include Bluetooth, Wireless Fidelity (WiFi), and Universal Serial Bus (USB), and the like.

In one or more embodiments, the device for training the speech recognition model provided in one or more embodiments of the present disclosure may be implemented in software. FIG. 3 shows the device 555 for training the speech recognition model stored in the memory 550, which may be software in the form of programs and plug-ins, including the following software modules: a feature extraction module 5551, and a semantic extraction module 5552. These modules are logical to be combined or further split based on the implemented functions. The functions of the various modules will be described below.

In other one or more embodiments, the speech recognition device provided in one or more embodiments of the present disclosure can be implemented in hardware. As an example, the speech recognition device provided in one or more embodiments of the present disclosure may be a processor in the form of a hardware decoding processor programmed to perform the speech recognition method provided in one or more embodiments of the present disclosure. For example, the processor in the form of a hardware decoding processor may employ one or more Application Specific Integrated Circuits (ASICs), DSPs, Programmable Logic Devices (PLDs), Complex Programmable Logic Devices (CPLDs), Field-Programmable Gate Arrays (FPGAs), or other electronic components.

In one or more embodiments, a terminal or server may implement the speech recognition method provided by one or more embodiments of the present disclosure by running a computer program or computer-executable instructions. For example, the computer program can be a native program (e.g., a dedicated speech recognition program) or a software module in an operating system, e.g., a speech recognition module that can be embedded in any program (e.g., an instant messaging client, an album program, an electronic map client, a navigation client); or a native application (APP), that is, a program that is required to be installed in an operating system to run. In summary, the computer program may be any form of application program, module, or plugin.

The method for training the speech recognition model provided in one or more embodiments of the present disclosure will be described based on the exemplary application and implementation of the server or terminal provided in one or more embodiments of the present disclosure.

Figure 4:
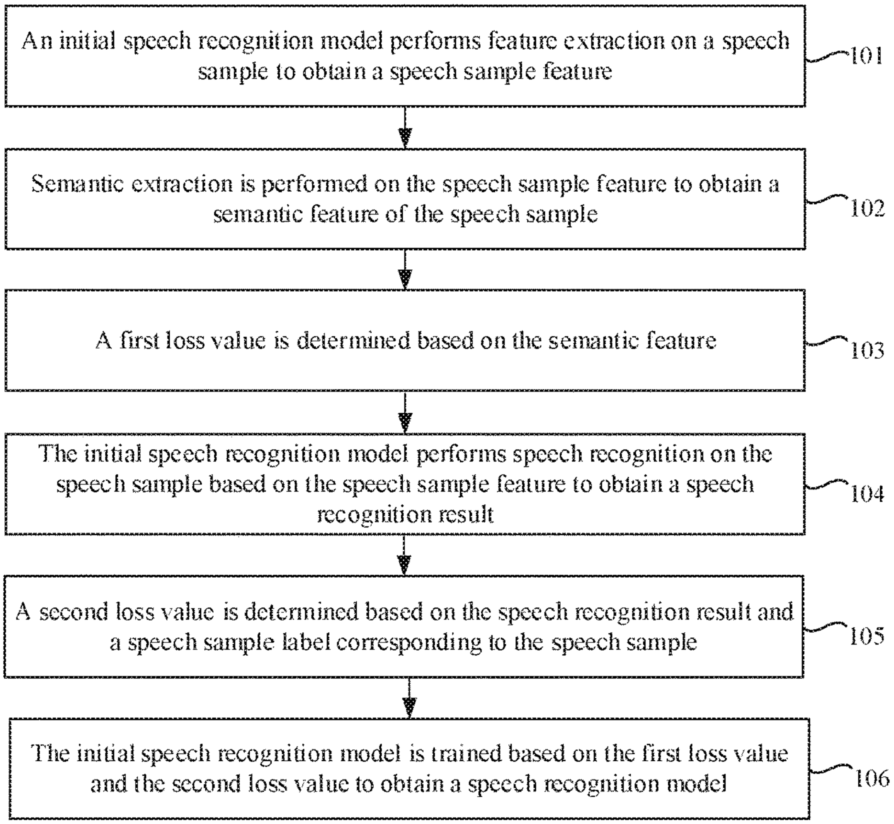
FIG. 4 is a schematic flowchart of a method for training a speech recognition model according to one or more embodiments of the present disclosure.

FIG. 4 is a flowchart of a method for training a speech recognition model according to one or more embodiments of the present disclosure. The method for training the speech recognition model according to one or more embodiments of the present disclosure will be described based on step 101 to step 104 shown in FIG. 4. The method for training the speech recognition model according to one or more embodiments of the present disclosure can be implemented by only a server or a terminal, or cooperatively by the server and the terminal. The following will take the example of being implemented by only the server for explanation.

In step 101, the initial speech recognition model performs feature extraction on the speech sample to obtain speech sample feature.

In one or more embodiments, the initial speech recognition model includes a feature extraction layer for performing feature extraction on the speech sample to obtain the speech sample feature; and a speech recognition layer for performing speech recognition on the speech sample based on the speech sample feature.

Figure 6:
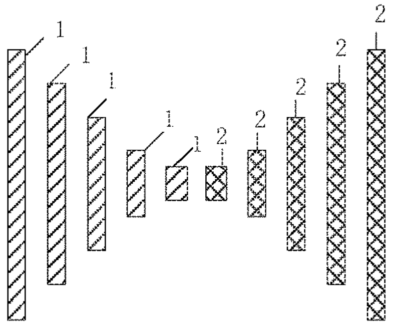
FIG. 6 is a first schematic diagram of a method for training a speech recognition model according to one or more embodiments of the present disclosure.

As an example, FIG. 6 is a first schematic diagram of a method for training a speech recognition model according to one or more embodiments of the present disclosure. The initial speech recognition model shown in FIG. 6 includes a feature extraction layer 1 and a speech recognition layer 2. The feature extraction layer 1 is used for performing feature extraction on the speech sample to obtain the speech sample feature, and the speech recognition layer 2 is used for performing speech recognition on the speech sample based on the speech sample feature.

In one or more embodiments, the feature extraction layer includes an encoding layer for encoding the speech sample to obtain the speech sample feature.

Figure 7:
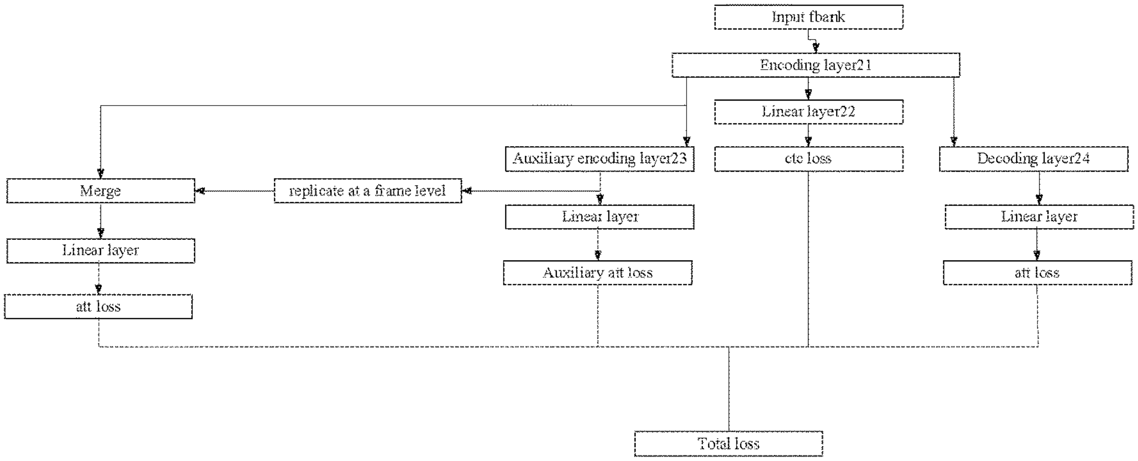
FIG. 7 is a second schematic diagram of a method for training a speech recognition model according to one or more embodiments of the present disclosure.

As an example, FIG. 7 is a second schematic diagram of a method for training a speech recognition model according to one or more embodiments of the present disclosure. An encoding layer 21 encodes the speech sample to obtain an encoding result. The linear layer 22 performs feature transform on the encoding result to obtain the speech sample feature.

In one or more embodiments, before performing the step 101, the speech sample may be determined in the following way. Speech data within a target period is obtained. A target speech segment in the speech data is identified. The target speech segment is deleted from the speech data to obtain the speech sample.

In one or more embodiments, the speech data includes speech segments respectively corresponding to each target moment in the target period.

As an example, the speech data A has a play time starting from 0s and ending at 10s, and includes multiple speech segments respectively corresponding to each target time in the target period (from 0s to 10s).

In one or more embodiments, the target speech segment is a speech segment in which there is no audio or there is noise in the speech data. The noise refers to speech having no semantics.

In one or more embodiments, the target speech segment in the speech data can be identified in the following way. The speech segment having no audio is determined as the target speech segment. Noise recognition is performed on the speech segment having audio to obtain a noise recognition result. If the noise recognition result indicates that the speech segment has noise, the speech segment is determined as the target speech segment.

In one or more embodiments, audio recognition may be performed on each speech segment to obtain an audio recognition result indicating whether the speech segment has audio.

As an example, the speech data A includes a speech segment A1, a speech segment A2, and a speech segment A3. If the speech segment A1 has no audio, the speech segment A1 is the target speech segment. If the speech segment A2 has both audio and noise, the speech segment A2 is the target speech segment. If the speech segment A3 has audio and has no noise, the speech segment A2 is not the target speech segment.

Thus, the speech data within a target period is obtained; the target speech segment in the speech data is identified; and the target speech segment is deleted from the speech data to obtain the speech sample. Thus, the obtained speech sample has noise, and at each moment has audio, thereby effectively compressing the storage space of the speech data, effectively reducing the influence of invalid information on the training efficiency of the speech recognition model, and effectively improving the training efficiency of the speech recognition model.

In one or more embodiments, step 101 may be performed in the following way. A speech signal processing is performed on the speech sample to obtain frequency domain information of the speech sample. The initial speech recognition model performs feature extraction on the speech sample based on the frequency domain information to obtain the speech sample feature.

In one or more embodiments, the speech signal processing includes pre-emphasis, framing, windowing, discrete Fourier transform, Mel filtering, and the like.

In one or more embodiments, the original speech signal passes through a high-pass filter to enhance the high frequency portion of the speech data and to enable the spectrum to be obtained using the same signal-to-noise ratio throughout the frequency band from low to high frequency. The high-pass filter in one or more embodiments of the present disclosure is as follows:

$$O(n)=k^{*}x(n)-m^{*}x(n-1), \tag{1}$$

where O(n) represents the result after high-pass filtering, n represents the audio sampling point index, x represents the specific audio, k and m represent the filtering coefficients. k represents the preservation capability for the original high-frequency information, and m represents the suppression capability for the original high-frequency information. The greater k is, the less m is, which means that the suppression capability of the original high frequency information is weaker. In an improved task which requires the combination of the acoustic information and the language information in one or more embodiments of the present disclosure, the high-pass filter in one or more embodiments of the present disclosure performs a specific pre-emphasis operation on the audio so as to effectively control the passing degree of the high-frequency information. The sensitivity of the language information is generally important at the high-frequency. Therefore, in the design of the language information to improve the acoustic information, the controllable design of the high-pass filter can provide a better effect.

In one or more embodiments, since it is required that the language information is used in conjunction with acoustic information, framing is important for the fine granularity of the extracted feature. In one or more embodiments of the present disclosure, the number N of the sample points after framing is set to 256 and correspond a time length about 20 ms. At the same time, in order to avoid a too large interval between two adjacent frames, which may result in the insufficient granularity of the extracted feature when the speech and emotion recognition are jointly modeled, there is an overlapping region between the two adjacent frames, and the overlapping region includes 128 audio sample points. Based on the framing, the granularity of the audio feature is improved when enhancing the acoustic information with the language information.

In one or more embodiments, after audio framing, a windowing operation is required to be performed on each frame to increase the continuity of the left end and right end of the frame. Since the feature extraction process is essentially a discrete representation of a continuous audio signal, such a discrete representation should represent continuous information as much as possible to reduce spectral leakage of the extracted audio feature. When the language information and the acoustic information are deeply fused, the representation of continuity is more sensitive. If there is spectral leakage, a large error occurs when the language information is judged, thereby affecting the final representation of the acoustic information. Therefore, the judgment of fine granularity requires continuous information before and after to ensure the effect. In view of this, one or more embodiments of the present disclosure designs a window function as follows:

$$O(n)=0.66-0.24*\sqrt{\left(1-\sin\left(\frac{2\pi n}{N-1}\right)^{2}\right)}, \tag{2}$$

where N represents the number of all sampling points, n represents the current sampling point, and O(n) represents the output result after windowing. After such a windowing function, the discrete information of each frame can be relatively well correlated. This is because the weight value of the sin function is defined, and a functional relationship between each frame is established by means of a specific weighting. When language information is used to improve the effect of the acoustic information, a relatively limited continuous representation of the discrete information of each frame can be provided, thereby improving the final effect.

In one or more embodiments, as for a discrete Fourier transform, since it is difficult to see the characteristics of the real audio signal when the signal is transformed only in the time domain, the signal after framing is also subjected to a discrete Fourier transform so as to be converted into an energy distribution in the frequency domain, thereby representing different audio characteristics. According to one or more embodiments, the discrete Fourier transform is not improved, that is, multiplication in the time domain and convolution in the frequency domain.

In one or more embodiments, as for a Mel filter, the function of applying the Mel filter is to map a linear spectrum into a Mel nonlinear spectrum conforming to human ear perception and then convert it to a cepstrum. After passing through the Mel filter, the human ear can establish a linear mapping relationship between the real perception of the audio feature and the discrete signal. According to one or more embodiments of the present disclosure, a set of trapezoidal filters having a center frequency of f(m)=1, 2, 3 . . . . M are designed for the improvement solution of using language information to enhance the effect of the acoustic information. According to one or more embodiments of the present disclosure, M is 22. The trapezoidal filter enables the low-amplitude portion to retain the original information as much as possible, enables the high-amplitude portion to be transformed into the information representation conforming to the human ear. As a result, the output of the acoustic model more meets the prediction requirements of the language model, complies with the improvement strategy proposed in one or more embodiments of the present disclosure, and improves the effect.

In step 102, semantic extraction is performed on the speech sample features to obtain the semantic feature of the speech sample.

In one or more embodiments, the semantic extraction can be implemented through an auxiliary encoding layer, which is used to extract the semantic feature in the feature. For example, as shown in FIG. 7, the auxiliary encoding layer 23 performs semantic extraction on the speech sample feature to obtain the semantic speech sample feature.

In one or more embodiments, the speech sample feature includes multiple sample sub-features. The step 102 can be implemented in the following way. Semantic recognition is performed on all of the sample sub-features to obtain multiple semantic recognition results. If one or more of the semantic recognition results respectively indicates that one or more of the sample sub-features have semantics, the one or more of the sample sub-features are determined respectively as one or more target sample sub-features. If the number of the target sample sub-features include one of the target sample sub-features, the one of the target sample sub-features is determined as the semantic feature. If the number of the target sample sub-features include multiple of the target sample sub-features, the multiple of the target sample sub-features are fused to obtain the semantic feature.

As an example, the speech sample feature B includes a sample sub-feature B1, a sample sub-feature B2, and a sample sub-feature B3. If the semantic recognition result of the sample sub-feature B1 indicates that the sample sub-feature B1 has semantics, the sample sub-feature B1 is determined as the target sample sub-feature. If the semantic recognition result of the sample sub-feature B2 indicates that the sample sub-feature B3 does not have semantics, the sample sub-feature B2 is not determined as the target sample sub-feature. If the semantic recognition result of the sample sub-feature B3 indicates that the sample sub-feature B3 has semantics, the sample sub-feature B3 is determined as the target sample sub-feature. If the target sample sub-features include multiple of target sample sub-features, the target sample sub-feature B3 and the target sample sub-feature B1 are fused to obtain the semantic feature.

In step 103, a first loss value is determined based on the semantic feature.

In one or more embodiments, before step 103, a fused feature may also be obtained in the following way. The semantic feature and the speech sample feature are fused to obtain the fused feature.

In one or more embodiments, step 103 may be performed in the following way. A semantic label feature corresponding to the speech sample is obtained. A first similarity between the semantic label feature and the semantic feature is determined. The first loss value is determined based on the fused feature and the first similarity.

In one or more embodiments, the first similarity is negatively correlated with a distance between the semantic label feature and the semantic feature.

In one or more embodiments, the first loss value can be determined based on the fused feature and the first similarity in the following way. The feature extraction is performed on the label of the speech sample to obtain a speech label feature. The speech label feature and the semantic label feature are fused to obtain a target label feature. A second similarity between the target label feature and the fused feature is determined. The first loss value is determined based on the first similarity and the second similarity.

In one or more embodiments, the second similarity is negatively correlated with a distance between the semantic label feature and the semantic feature.

In one or more embodiments, the first loss value can be determined based on the first similarity and the second similarity in the following way. The weighted sum of the first similarity. The second similarity is obtained as the first loss value.

As an example, the attention loss shown in FIG. 7 can be the second similarity, and the auxiliary attention loss shown in FIG. 7 can be the first similarity.

In one or more embodiments, the weights of the weighted sum respectively corresponding to the first similarity and the second similarity may be specifically set based on actual conditions.

In one or more embodiments, the first loss value can be determined based on the semantic feature in the following way. The speech recognition is performed on the speech sample based on the fused feature by the initial speech recognition model to obtain a first recognition result. Speech recognition is performed on the speech sample based on the semantic feature by the initial speech recognition model to obtain a second recognition result. The first loss value is determined based on the first recognition result and the second recognition result.

In one or more embodiments, the first loss value can be determined based on the first recognition result and the second recognition result in the following way. A third similarity between the first recognition result and the speech sample label is determined. A fourth similarity between the second recognition result and the speech sample label is determined. The first loss value is determined based on the third similarity and the fourth similarity.

As an example, the attention loss shown in FIG. 7 may be the third similarity, and the auxiliary attention loss shown in FIG. 7 may be the fourth similarity.

In one or more embodiments, the first loss value can be determined based on the third similarity and the fourth similarity in the following way. The weighted sum of the third similarity and the fourth similarity is obtained as the first loss value.

Thus, the third similarity between the first recognition result and the speech sample label is determined, the fourth similarity between the second recognition result and the speech sample label is determined, and the first loss value is determined based on the third similarity and the fourth similarity. Through the first loss value determined based on the first recognition result and the second recognition result, the sample for training the initial speech recognition model is effectively enhanced, so that the recognition performance of the speech recognition model based on the first loss value is effectively improved.

In step 104, the initial speech recognition model performs speech recognition on the speech sample based on the speech sample feature to obtain the speech recognition result.

In one or more embodiments, the initial speech recognition model includes a speech recognition layer, and the step 104 may be performed in the following way. The speech recognition layer of the initial speech recognition model performing speech recognition on the speech sample based on the speech sample feature to obtain the speech recognition result.

As an example, as shown in FIG. 7, the decoding layer shown in FIG. 7 is the speech recognition layer. The decoding layer 24 of the initial speech recognition model performs speech recognition on the speech sample based on the speech sample feature to obtain the speech recognition result.

In step 105, a second loss value is determined based on the speech recognition result and the speech sample label corresponding to the speech sample.

In one or more embodiments, the second loss value can be determined based on the speech recognition result and the speech sample label corresponding to the speech sample in the following way. A fifth similarity between the speech recognition result and the speech sample label is determined. Feature extraction is performed on the speech sample label to obtain a speech label feature. A sixth similarity between the speech label feature and the speech sample feature is determined. The second loss value is determined based on the fifth similarity and the sixth similarity.

In one or more embodiments, the second loss value can be determined based on the fifth similarity and the sixth similarity in the following way. The weighted sum of the fifth similarity and the sixth similarity is obtained as the second loss value.

As an example, as shown in FIG. 7, the fifth similarity may be the attention loss shown in FIG. 6, and the sixth similarity may be the CTC loss shown in FIG. 7.

Thus, the fifth similarity between the speech recognition result and the speech sample label is determined, feature extraction is performed on the speech sample label to obtain the speech label feature, the sixth similarity between the speech label feature and the speech sample feature is determined, and the second loss value is determined based on the fifth similarity and the sixth similarity. The fifth similarity between the speech recognition result and the speech sample label can accurately reflect the difference between the speech recognition result and the speech sample label, so that the overall performance of the initial speech recognition model can be evaluated, the sixth similarity between the speech label feature and the speech sample feature can accurately evaluate the difference between the speech sample feature and the speech label feature, and the performance of the feature extraction layer of the initial speech recognition model can be evaluated. Thus, the second loss value determined based on the fifth similarity and the sixth similarity can not only improve the recognition performance of the initial speech recognition model, but also improve the feature extraction performance of the initial speech recognition model.

In step 106, the initial speech recognition model is trained based on the first loss value and the second loss value to obtain a speech recognition model.

In one or more embodiments, step 106 may be performed in the following way. A first weight corresponding to the first loss value is obtained. A second weight corresponding to the second loss value is obtained. The first loss value is multiplied by the first weight to obtain a first target loss value. The second loss value is multiplied by the second weight to obtain a second target loss value. The first target loss value is added to the second target loss value to obtain a total target loss value. The initial semantic recognition model is trained based on the total target loss value to obtain the speech recognition model.

As an example, the total target loss value may be expressed as follows:

$$L = \alpha_1 L_1 + \alpha_2 L_2, \tag{3}$$

where L represents the total target loss value. $L_1$ represents the first loss value. $L_2$ represents the second loss value. $\alpha_1$ represents the first weight corresponding to the first loss value. $\alpha_2$ represents the second weight corresponding to the second loss value.

Thus, the initial speech recognition model performs feature extraction on the speech sample to obtain the speech sample feature, semantic extraction is performed on the speech sample feature to obtain the semantic feature of the speech sample, the first loss value is determined based on the semantic feature, the second loss value is determined based on the speech recognition result and the speech sample label, and the initial speech recognition model is trained based on the first loss value and the second loss value to obtain the speech recognition model. Thus, semantic extraction is performed on the speech sample feature to obtain a semantic feature capable of accurately reflecting the semantics of a speech sample, the first loss value determined based on the semantic feature effectively improves the semantic understanding performance of the speech recognition model, and the second loss value determined based on the speech recognition result and the speech sample label corresponding to the speech sample effectively improves the recognition accuracy of the speech recognition model. Thus, the speech recognition model is trained based on the first loss value and the second loss value to obtain the speech recognition model which effectively improve the semantic understanding performance and the recognition accuracy, thereby effectively improving the recognition performance of the speech recognition model.

Figure 5:
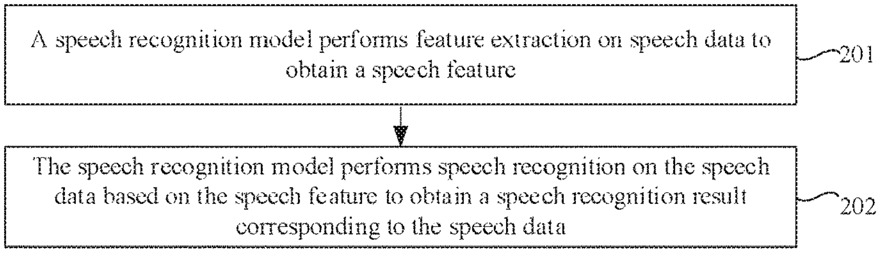
FIG. 5 is a schematic flowchart of a method for speech recognition according to one or more embodiments of the present disclosure.

FIG. 5 is a flowchart of a method for speech recognition according to one or more embodiments of the present disclosure. Description will be made with reference to step 201 to step 202 shown in FIG. 5. The method for training a speech recognition model according to one or more embodiments of the present disclosure may be implemented by only a server or a terminal, or may be implemented cooperatively by a server and a terminal. The following will take the implementation of only the terminal as an example for explanation.

In step 201, the speech recognition model performs feature extraction on the speech data to obtain a speech feature.

In one or more embodiments, the speech recognition model includes a feature extraction layer. The step 201 may be performed in the following way. The feature extraction layer of the speech recognition model performs feature extraction to obtain the speech feature.

As an example, as shown in FIG. 6, the feature extraction layer 1 of the speech recognition model shown in FIG. 6 performs feature extraction on the speech data to obtain the speech feature.

In step 202, the speech recognition model performs speech recognition on the speech data based on the speech feature to obtain a speech recognition result corresponding to the speech data.

In one or more embodiments, the speech recognition model is derived by training the initial speech recognition model based on the semantic characteristics of the speech samples.

In one or more embodiments, the speech recognition model includes a speech recognition layer. The step 201 may be implemented in the following way. The speech recognition layer of the speech recognition model performs speech recognition on the speech data based on the speech feature to obtain the speech recognition result.

Thus, the initial speech recognition model performs feature extraction on the speech sample to obtain the speech sample feature, semantic extraction is performed on the speech sample feature to obtain the semantic feature of the speech sample, the first loss value is determined based on the semantic feature, the second loss value is determined based on the speech recognition result and the speech sample label, and the initial speech recognition model is trained based on the first loss value and the second loss value to obtain the speech recognition model. Thus, semantic extraction is performed on the speech sample feature to obtain a semantic feature which accurately reflects the semantics of a speech sample, the first loss value determined based on the semantic feature effectively improves the semantic understanding performance of the speech recognition model, and the second loss value determined based on the speech recognition result and the speech sample label corresponding to the speech sample effectively improves the recognition accuracy of the speech recognition model. Thus, the speech recognition model is trained based on the first loss value and the second loss value to obtain the speech recognition model which effectively improve the semantic understanding performance and the recognition accuracy, thereby effectively improving the recognition performance of the speech recognition model. The speech recognition model performs speech recognition on the speech data based on the speech feature, so that the speech recognition result corresponding to the speech data is more accurate.

Hereinafter, an exemplary application of one or more embodiments of the present disclosure in an actual speech recognition application scenario will be described.

Generally, in an end-to-end speech recognition, multilayer networks tend to have greater generalization capabilities. At present, the optimal end-to-end speech recognition method based on neural network is a conformer-transformer structure. The conformer tends to use CTC loss for alignment and loss calculation of sequence. The output of the conformer is input to the transformer, which uses sequence loss to model. The conformer is used for acoustic feature mapping and transformer is used for modeling of semantic information. However, due to natural independence assumption in principle of CTC, the conformer is unable to model the semantic information for the acoustic sequence, which leads to low performance of the conformer. Although the introduction of the transformer enables the output of the last layer of the conformer to have a certain modeling capability of semantic information, it is difficult for the middle layer of the network to capture the semantic information because the network has too many layers. Moreover, the cooperation of the transformer and the conformer often adopts a separate calculation of loss, which is difficult to play a role in improving the semantic correlation of the conformer.

In one or more embodiments of the present disclosure, another auxiliary transformer is added to the conformer-transformer structure, and the auxiliary transformer is not used in prediction. Only in training, the output of the auxiliary transformer is provided to "attention" loss function, and based on the number of output frames of the conformer, the output of the auxiliary transformer is repeated at a frame level to adapt to the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy.

In one or more embodiments of the present disclosure, another auxiliary transformer is added to the conformer-transformer structure, and the auxiliary transformer is not used in prediction. Only in training, the output of the auxiliary transformer is provided to "attention" loss function, and based on the number of output frames of the conformer, the output of the auxiliary transformer is repeated at a frame level to adapt to the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy. According to one or more embodiments of the present disclosure, the CTC loss is also improved to comply with the solution of the language feature to improve the acoustic feature.

In addition, one or more embodiments of the present disclosure have also provided an improved scheme for Filter Bank (fbank) features so as to enable the extracted features to better capture fine granular information that comply with the combination of transformer language and conformer acoustics, thereby improving the final effect.

In one or more embodiments, as shown in FIG. 7, the solution may include following steps. An index processing is performed on 50,000-hour pure speech recognition data to obtain a text index corresponding to each piece of speech data, and the data is used as speech recognition pre-training data. Speech separation is performed on 50,000-hour speech data based on a labeling result. A silent audio segment is filtered, non-human noise or inaudible human noise is labelled, and separation is performed on the speech data, the time length of separation ranges from 0.8 s to 2.0 s. This is because most of the noise in real life occurs within the time length. The time length is used as an Unknown (UNK) label. In training, the model is also allowed to learn the UNK label, so that the model is prevented from learning a noise label or a silent label as "blank" in the CTC. Then a result labelled as UNK is filtered by a regular matching when the model outputs, so that the anti-noise capability of the model can be effectively improved. In one or more embodiments of the present disclosure, it is required that the conformer part is connected to the output of the transformer, that is, it is required that the acoustic information is combined with the language information. When the model has poor robustness to noise, it is prone to misrecognize noise as a text, and the misrecognized text is often confusing in semantic information. If the confusing semantic information is combined with the acoustic information, it will lead to training problems. Therefore, the solution is also used to assist the solution of the transformer to improve the conformer and improve the anti-noise robustness of the model.

In one or more embodiments, the original speech signal passes through a high-pass filter to enhance the high frequency portion of the speech data and to enable the spectrum to be obtained using the same signal-to-noise ratio throughout the frequency band from low to high frequency. The high-pass filter in one or more embodiments of the present disclosure is as follows:

$$O(n)=k^{*}x(n)-m^{*}x(n-1), \tag{4}$$

where O(n) represents the result after high-pass filtering, n represents the audio sampling point index, x represents the specific audio, k and m represent the filtering coefficients. k represents the preservation capability for the original high-frequency information, and m represents the suppression capability for the original high-frequency information. The greater k is, the less m is, which means that the suppression capability of the original high frequency information is weaker. In an improved task which requires the combination of the acoustic information and the language information in one or more embodiments of the present disclosure, the high-pass filter in one or more embodiments of the present disclosure performs a specific pre-emphasis operation on the audio so as to effectively control the passing degree of the high-frequency information. The sensitivity of the language information is generally important at the high-frequency. Therefore, in the design of the language information to improve the acoustic information, the controllable design of the high-pass filter can provide a better effect.

In one or more embodiments, since it is required that the language information is used in conjunction with acoustic information, framing is important for the fine granularity of the extracted feature. In one or more embodiments of the present disclosure, the number N of the sample points after framing is set to 256 and correspond a time length about 20 ms. At the same time, in order to avoid a too large interval between two adjacent frames, which may result in the insufficient granularity of the extracted feature when the speech and emotion recognition are jointly modeled, there is an overlapping region between the two adjacent frames, and the overlapping region includes 128 audio sample points. Based on the framing, the granularity of the audio feature is improved when enhancing the acoustic information with the language information.

In one or more embodiments, after audio framing, a windowing operation is required to be performed on each frame to increase the continuity of the left end and right end of the frame. Since the feature extraction process is essentially a discrete representation of a continuous audio signal, such a discrete representation should represent continuous information as much as possible to reduce spectral leakage of the extracted audio feature. When the language information and the acoustic information are deeply fused, the representation of continuity is more sensitive. If there is spectral leakage, a large error occurs when the language information is judged, thereby affecting the final representation of the acoustic information. Therefore, the judgment of fine granularity requires continuous information before and after to ensure the effect. In view of this, one or more embodiments of the present disclosure designs a window function as follows:

$$O(n) = 0.66 - 0.24 * \sqrt{\left(1 - \sin\left(\frac{2\pi n}{N-1}\right)^2\right)}, \tag{5}$$

where N represents the number of all sampling points, n represents the current sampling point, and O(n) represents the output result after windowing. After such a windowing function, the discrete information of each frame can be relatively well correlated. This is because the weight value of the sin function is defined, and a functional relationship between each frame is established by means of a specific weighting. When language information is used to improve the effect of the acoustic information, a relatively limited continuous representation of the discrete information of each frame can be provided, thereby improving the final effect.

In one or more embodiments, as for a discrete Fourier transform, since it is difficult to see the characteristics of the real audio signal when the signal is transformed only in the time domain, the signal after framing is also subjected to a discrete Fourier transform so as to be converted into an energy distribution in the frequency domain, thereby representing different audio characteristics. According to one or more embodiments, the discrete Fourier transform is not improved, that is, multiplication in the time domain and convolution in the frequency domain.

In one or more embodiments, as for a Mel filter, the function of applying the Mel filter is to map a linear spectrum into a Mel nonlinear spectrum conforming to human ear perception and then convert it to a cepstrum. After the Mel filter, the human ear can establish a linear mapping relationship between the real perception of the audio feature and the discrete signal. According to one or more embodiments of the present disclosure, a set of trapezoidal filters having a center frequency of f(m)=1, 2, 3 . . . . M are designed for the improvement solution of using language information to enhance the effect of the acoustic information. According to one or more embodiments of the present disclosure, M is 22. The trapezoidal filter enables the low-amplitude portion to retain the original information as much as possible, enables the high-amplitude portion to be transformed into the information representation conforming to the human ear. As a result, the output of the acoustic model more meets the prediction requirements of the language model, complies with the improvement strategy proposed in one or more embodiments of the present disclosure, and improves the effect.

In one or more embodiments of the present disclosure, another auxiliary transformer is added to the conformer-transformer structure, and the auxiliary transformer is not used in prediction. Only in training, the output of the auxiliary transformer is provided to "attention" loss function, and based on the number of output frames of the conformer, the output of the auxiliary transformer is repeated at a frame level to adapt to the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy.

According to the embodiment of the present disclosure, a multi-step sequential training is performed for multiple times, which ensures that the model of each step forms a model representation with stable parameters based on basic data, thereby laying a good foundation for the final combination of language information and acoustic information.

A 12-layer conformer and a 6-layer conformer models are pre-trained by using the 60000-hour data, and the modified fbank feature is extracted. As it is the pre-training stage of the speech recognition model, a greater learning rate is used for the experiment, and the optimizer for training is optimized based on Adam. Due to the fine-granular adjustment and improvement of the input fbank feature, a small amount of parameter changes during training can easily cause gradient oscillations. Therefore, according to one or more embodiments of the application, the Adam optimizer is modified. Specifically, based on the original Adam, an L2 regularized item is added only when the parameter is updated, and an L2 regularized item added when the gradient is updated in the original Adam is removed. As a result, when the gradient changes, the caused severe parameter becomes less, and the speed of the speech recognition training and the effect of the model to find the best path are improved. the CTC loss and the attention loss are combined. According to one or more embodiments of the present disclosure, the CTC loss is also improved. A specific improvement scheme is to replace the dynamic programming in the CTC with a back-tracking algorithm to find the best path. The reason for the replacement is that although the dynamic programming can perform the sequence search relatively quickly, the training process of speech recognition is essentially a process in which all possible sequences are required to be obtained. The back-tracking algorithm can effectively obtain all sequence solutions, and obtains the best result in all sequence solutions. This scheme increases the training time but improves the accuracy.

In each training, the features are input into the conformer in batches. The conformer may use the conformer, or may use the transformer, lstm, Time Delay Neural Network (TDNN), Recurrent Neural Network Transducer (RNN-T) and the like. The output of the conformer represents the acoustic feature vector having a dimension generally the number of 16*frame number*256. The output is input to the linear layer of the improved CTC, which has a dimension converted to 16*frame number*word classification index number, and is input to the improved CTC loss, and the improved CTC loss is calculated.

The output is input to the transformer. The transformer may use the transformer, LSTM and the like. The output of the transformer is 16*word number of the speech*256. A specific method for training is to predict a later word from a previous word, and the principle can be found at: https://blog.csdn.net/weixin_45193103/article/details/124002864?ydreferer=aHR0cHM6Ly9jbi5iaW5nLmNvbS8% 3D. The output of transformer is input to linear and softmax, and has a dimension of 16*word number of the speech*word classification index number. The Attention loss is calculated, which generally uses the Kullback-Leibler (KL) divergence loss. The CTC loss and the attention loss are combined to calculate the total loss, and training is performed. After the loss is stably converged, the model 1 is obtained.

By loading the generated model 1, an auxiliary transformer branch is connected after the conformer. The parameters of the branch use randomly initialized parameters to freeze the structures of the conformer and transformer, the output of conformer is input to the auxiliary transformer, and the output of the auxiliary transformer is output to the attention loss until loss converges. The model is saved to obtain Model 2.

By loading the model 2, the output of the auxiliary transformer is repeated at the frame level to adapt the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy. During the training period, the learning rate is reduced to one tenth. The auxiliary semantic improved CTC loss, acoustic improved CTC loss, and auxiliary transformer attention loss are combined together until the loss converges. The model is saved. Thus, the model training phase is completed.

Here, the semantic improved CTC loss output by the encoding layer and the auxiliary transformer is referred to as the semantic improved CTC loss LCTC_LM_improved, and the loss of the auxiliary decoding layer is referred to as the auxiliary decoding label smoothing loss (i.e., attention loss) LATT_AUX. The LCTC_LM_improved is expressed as follows:

$$\text{LCTC\_LM\_improved} = -\log PCTC(y \mid W * concat\,(xenc, \text{xdec\_aux\_repeat}) + b), \quad (6)$$

where Y represents the label, xenc represents the output of the conformer, xdec_aux_repeat represents a vector output by the auxiliary transformer and after copied at the frame level. W and b represents the weight and offset of the linear layer, respectively, and P represents the CTC label probability.

The total loss of encoder is then expressed as follows:

$$\text{Lenc\_total} = (1-q) * \text{LCTC\_improved} + q * \text{LCTC\_LM\_improved}, \quad (7)$$

where the value of q may be 0.2, which can also be determined experimentally, and is not unique.

The LATT_AUX is expressed as follows:

$$\text{LATT\_AUX} = -\log PATT(y \mid x), \quad (8)$$

where y represents the label, x represents an input, i.e., the output of the encoder, and P represents an attention label probability.

The total loss of the transformer is expressed as follows:

$$\text{LATT\_total} = \beta * LATT + (1-\beta) * \text{LATT\_middle}, \quad (9)$$

where the value of β may be 0.7, which can also be determined experimentally, and is not unique.

During training, the total loss is expressed as follows:

$$Ltotal = k * \text{Lenc\_total} + (1-k) * \text{LATT\_total}. \quad (10)$$

Figure 8:
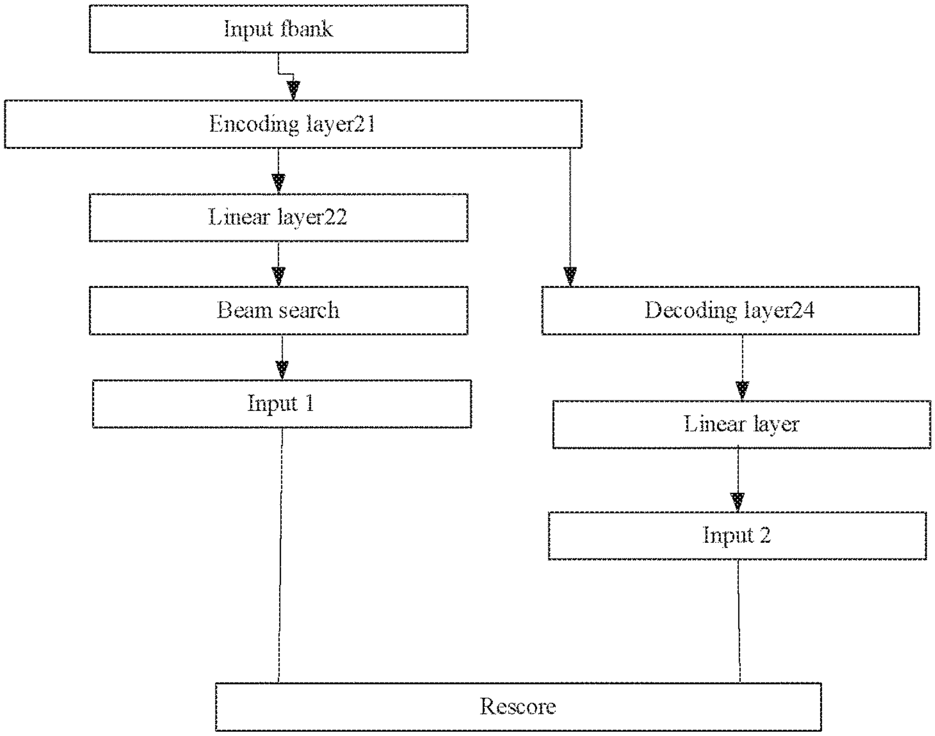
FIG. 8 is a schematic diagram of a method for speech recognition according to one or more embodiments of the present disclosure.

In one or more embodiments, FIG. 8 is a flowchart of a method for speech recognition according to one or more embodiments of the present disclosure. In a model application stage, when the speech recognition model is applied, the parameters of the conformer and the transformer are loaded, and an auxiliary transformer is not loaded. After speech input, an improved 80-dimensional fbank feature is extracted, and a model search score is obtained by model reasoning, and a recognition result is output. When the algorithm is applied, a speech model which is improved and has a good effect can be directly applied to a scene to be recognized, such as a speech quality check, a speech robot and the like. An auxiliary semantic CTC loss function is added. The input of the loss function is a merged output of the conformer and the auxiliary transformer, so that the conformer has more semantic information to perform deep feature fusion, the semantic modeling capability of the conformer is improved, and the model accuracy is improved. This effectively improves the accuracy of the model without affecting efficiency. One or more embodiments of the present disclosure select a scene of intelligent calling as a detailed explanation.

In one or more embodiments of the present disclosure, another auxiliary transformer is added to the conformer-transformer structure, and the auxiliary transformer is not used in prediction. Only in training, the output of the auxiliary transformer is provided to "attention" loss function, and based on the number of output frames of the conformer, the output of the auxiliary transformer is repeated at a frame level to adapt to the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy. The drawback that CTC in the original encoder only captures independence assumption information is effectively alleviated, thereby effectively improving the accuracy performance of the model without affecting efficiency.

One or more embodiments of the present disclosure propose an improved scheme for fbank features, having an object to enable the extracted features to better capture fine granular information that comply with the combination of transformer language and conformer acoustics, thereby improving the final effect.

Another auxiliary transformer is added to the conformer-transformer structure, and the auxiliary transformer is not used in prediction. Only in training, the output of the auxiliary transformer is provided to "attention" loss function, and based on the number of output frames of the conformer, the output of the auxiliary transformer is repeated at a frame level to adapt to the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy. One or more embodiments of the present disclosure have also improved the CTC loss to comply with the improvement in acoustic characteristics of language features. And the training process is optimized.

According to the embodiment of the present disclosure, a multi-step sequential training is performed for multiple times, which ensures that the model of each step forms a model representation with stable parameters based on basic data, thereby laying a good foundation for the final combination of language information and acoustic information.

It will be appreciated that, in one or more embodiments of the present disclosure, when data relating to speech or the like to be recognized is applied to a particular product or technology, a user's permission or consent is required, and the collection, use and processing of the relevant data requires compliance with the relevant laws, regulations and standards of the relevant countries and regions.

The implementation of the training device 455 of the speech recognition model provided in the embodiments of the present disclosure is described as an exemplary structure of a software module. In one or more embodiments, as shown in FIG. 2, the software module stored in the training device 455 of the speech recognition model of the memory 450 may include a feature extraction module for performing feature extraction on a speech sample by the initial speech recognition model to obtain a speech sample feature. A semantic extraction module, configured to perform semantic extraction on the speech sample feature to obtain a semantic feature of the speech sample, and determine a first loss value based on the semantic feature; A speech recognition module, configured to perform speech recognition on the speech samples based on the speech sample features in the initial speech recognition model to obtain a speech recognition result; A training module, configured to determine a second loss value according to the speech recognition result and a speech sample label corresponding to the speech sample, and train the initial speech recognition model based on the first loss value and the second loss value to obtain the speech recognition model.

In one or more embodiments, the device for training the speech recognition model further includes a speech processing module configured to obtain speech data in a target period and identify a target speech segment in the speech data, the target speech segment having no audio or having noise; and delete the target speech segment from the speech data to obtain the speech sample.

In one or more embodiments, the speech recognition module is further configured to determine at least one of the speech segments having no audio as the target speech segment; and determine at least one of the speech segments having no audio and having noise as the target speech segment.

In one or more embodiments, the feature extraction module is further configured to perform a signal processing on the speech sample to obtain frequency domain information of the speech sample; and perform, by the initial speech recognition model, the feature extraction on the speech sample based on the frequency domain information to obtain the speech sample feature.

In one or more embodiments, the speech sample feature comprises multiple sample sub-features. The semantic extraction module is further configured to identify one or more of the sample sub-features having semantic information as one or more target sample sub-features; and determine one of the target sample sub-features as the semantic feature of the speech sample, or fuse multiple of the target sample sub-features to obtain the semantic feature of the speech sample.

In one or more embodiments, the device for training the speech recognition model further includes a fusion module configured to fuse the semantic feature and the speech sample feature to obtain a fused feature.

In one or more embodiments, the semantic extraction module is further configured to obtain a semantic label feature corresponding to the speech sample; determine a first similarity between the semantic label feature and the semantic feature; and determine the first loss value based on the fused feature and the first similarity.

In one or more embodiments, the semantic extraction module is further configured to perform, by the initial speech recognition model, speech recognition on the speech sample based on the fused feature to obtain a first recognition result; perform, by the initial speech recognition model, speech recognition on the speech sample based on the semantic feature to obtain a second recognition result; and determine the first loss value based on the first recognition result and the second recognition result.

In one or more embodiments, the semantic extraction module is further configured to determine a third similarity between the first recognition result and the speech sample label; determine a fourth similarity between the second recognition result and the speech sample label; and determine the first loss value based on the third similarity and the fourth similarity.

In one or more embodiments, the training module is further configured to determine a fifth similarity between the speech recognition result and the speech sample label; perform feature extraction on the speech sample label to obtain a speech label feature; determine a sixth similarity between the speech label feature and the speech sample feature; and determine the second loss value based on the fifth similarity and the sixth similarity.

In one or more embodiments, the training module is further configured to obtain a first weight corresponding to the first loss value and a second weight corresponding to the second loss value; multiply the first loss value by the first weight to obtain a first target loss value; multiply the second loss value by the second weight to obtain a second target loss value; add the first target loss value to the second target loss value to obtain a total target loss value; and train the initial speech recognition model based on the total target loss value to obtain the speech recognition model.

According to one or more embodiments of the present disclosure, the exemplary structure of The implementation of the speech recognition device 555 implemented as a software module is described. In one or more embodiments, as shown in FIG. 4, the software module in the speech recognition device 555 stored in the memory 550 may include a feature extraction module for performing feature extraction on the speech data by the speech recognition model to obtain the speech feature; and a speech recognition module for performing by the speech recognition model speech recognition on the speech data based on the speech feature to obtain a speech recognition result corresponding to the speech data. The speech recognition model is obtained by training an initial speech recognition model based on a semantic feature of a speech sample.

One or more embodiments of the present disclosure provide a computer program product including a computer program or computer executable instructions stored in a computer readable storage medium. A processor of an electronic device reads the computer-executable instructions from the computer readable storage medium, and executes the computer-executable instructions so that the electronic device executes the method for training the speech recognition model and the speech recognition method in one or more embodiments of the present disclosure.

One or more embodiments of the present disclosure provide a computer readable storage medium storing computer-executable instructions which, when executed by a processor, cause the processor to perform a method for training a speech recognition model and a speech recognition method provided in one or more embodiments of the present disclosure.

In one or more embodiments, the computer-readable storage medium may be a memory such as a Ferroelectric RAM (FRAM), a ROM, a Programmable read-only memory (PROM), an Erasable Programmable Read-Only Memory (EPROM), an Electrically Erasable Programmable read only memory (EEPROM), a flash memory, a magnetic surface memory, an optical disk, or a Compact Disc Read-Only Memory (CD-ROM) and the like, and various electronic devices including one or any combination of the memories.

In one or more embodiments, the computer-executable instructions may be in the form of a program, software, software module, script, or code, may be written in any form of programming language (including compilation or interpretation languages, or declarative or procedural languages), and may be deployed in any form, including as a stand-alone program or as a module, component, subroutine, or other unit suitable for use in a computing environment.

By way of example, the computer-executable instructions may, but do not necessarily correspond to files in a file system, may be stored in a portion of a file holding other programs or data, such as one or more scripts stored in a Hyper Text Markup Language (HTML) document, in a single file dedicated to the program in question, or in multiple collaborative files (e.g., files storing one or more modules, subprograms, or code portions).

By way of example, the computer-executable instructions may be deployed to be executed on one electronic device, or on multiple electronic devices located at a location, or alternatively, on multiple electronic devices distributed at multiple locations and interconnected by a communication network.

In summary, one or more embodiments of the present disclosure have the following advantages:

(1) The initial speech recognition model performs feature extraction on the speech sample to obtain the speech sample feature, semantic extraction is performed on the speech sample feature to obtain the semantic feature of the speech sample, the first loss value is determined based on the semantic feature, the second loss value is determined based on the speech recognition result and the speech sample label, and the initial speech recognition model is trained based on the first loss value and the second loss value to obtain the speech recognition model. Thus, semantic extraction is performed on the speech sample feature to obtain a semantic feature capable of accurately reflecting the semantics of a speech sample, the first loss value determined based on the semantic feature effectively improves the semantic understanding performance of the speech recognition model, and the second loss value determined based on the speech recognition result and the speech sample label corresponding to the speech sample effectively improves the recognition accuracy of the speech recognition model. Thus, the speech recognition model is trained based on the first loss value and the second loss value to obtain the speech recognition model which effectively improve the semantic understanding performance and the recognition accuracy, thereby effectively improving the recognition performance of the speech recognition model.

(2) The initial speech recognition model performs feature extraction on the speech sample to obtain the speech sample feature, semantic extraction is performed on the speech sample feature to obtain the semantic feature of the speech sample, the first loss value is determined based on the semantic feature, the second loss value is determined based on the speech recognition result and the speech sample label, and the initial speech recognition model is trained based on the first loss value and the second loss value to obtain the speech recognition model. Thus, semantic extraction is performed on the speech sample feature to obtain a semantic feature which accurately reflects the semantics of a speech sample, the first loss value determined based on the semantic feature effectively improves the semantic understanding performance of the speech recognition model, and the second loss value determined based on the speech recognition result and the speech sample label corresponding to the speech sample effectively improves the recognition accuracy of the speech recognition model. Thus, the speech recognition model is trained based on the first loss value and the second loss value to obtain the speech recognition model which effectively improve the semantic understanding performance and the recognition accuracy, thereby effectively improving the recognition performance of the speech recognition model. The speech recognition model performs speech recognition on the speech data based on the speech feature, so that the speech recognition result corresponding to the speech data is more accurate.

(3) According to the embodiment of the present disclosure, a multi-step sequential training is performed for multiple times, which ensures that the model of each step forms a model representation with stable parameters based on basic data, thereby laying a good foundation for the final combination of language information and acoustic information.

(4) One or more embodiments of the present disclosure propose an improved scheme for fbank features so as to enable the extracted features to better capture fine granular information that comply with the combination of transformer language and conformer acoustics, thereby improving the final effect.

(5) In one or more embodiments of the present disclosure, another auxiliary transformer is added to the conformer-transformer structure, and the auxiliary transformer is not used in prediction. Only in training, the output of the auxiliary transformer is provided to "attention" loss function, and based on the number of output frames of the conformer, the output of the auxiliary transformer is repeated at a frame level to adapt to the output of the conformer. Then the output of the conformer and the output of the auxiliary transformer are merged together, and the output dimension changes from 256 to 512. Then a 512 dimensional vector is changed back to a 256 dimensional vector through a linear layer, and is input to the CTC loss. Thus, an auxiliary semantic CTC loss function is added. The input of the loss function is the merged output of the conformer and the auxiliary transformer, so that the conformer has more semantic information to perform deep feature fusion, thereby improving the semantic modeling capability of the conformer and improving the model accuracy. The drawback that CTC in the original encoder only captures independence assumption information is effectively alleviated, thereby effectively improving the accuracy performance of the model without affecting efficiency.

(6) The fifth similarity between the speech recognition result and the speech sample label is determined, feature extraction is performed on the speech sample label to obtain the speech label feature, the sixth similarity between the speech label feature and the speech sample feature is determined, and the second loss value is determined based on the fifth similarity and the sixth similarity. The fifth similarity between the speech recognition result and the speech sample label can accurately reflect the difference between the speech recognition result and the speech sample label, so that the overall performance of the initial speech recognition model can be evaluated, the sixth similarity between the speech label feature and the speech sample feature can accurately evaluate the difference between the speech sample feature and the speech label feature, and the performance of the feature extraction layer of the initial speech recognition model can be evaluated. Thus, the second loss value determined based on the fifth similarity and the sixth similarity can not only improve the recognition performance of the initial speech recognition model, but also improve the feature extraction performance of the initial speech recognition model.

(7) The third similarity between the first recognition result and the speech sample label is determined, the fourth similarity between the second recognition result and the speech sample label is determined, and the first loss value is determined based on the third similarity and the fourth similarity. Through the first loss value determined based on the first recognition result and the second recognition result, the sample for training the initial speech recognition model is effectively enhanced, so that the recognition performance of the speech recognition model based on the first loss value is effectively improved.

(8) The third similarity between the first recognition result and the speech sample label is determined, the fourth similarity between the second recognition result and the speech sample label is determined, and the first loss value is determined based on the third similarity and the fourth similarity. Through the first loss value determined by the first recognition result and the second recognition result, the sample enhancement for training the initial speech recognition model is effectively realized, so that the recognition performance of the speech recognition model obtained by training based on the first loss value is effectively improved.

(9) As for a Mel filter, the function of applying the Mel filter is to map a linear spectrum into a Mel nonlinear spectrum conforming to human ear perception and then convert it to a cepstrum. After passing through the Mel filter, the human ear can establish a linear mapping relationship between the real perception of the audio feature and the discrete signal. According to one or more embodiments of the present disclosure, a set of trapezoidal filters having a center frequency of f(m)=1, 2, 3 . . . . M are designed for the improvement solution of using language information to enhance the effect of the acoustic information. According to one or more embodiments of the present disclosure, M is 22. The trapezoidal filter enables the low-amplitude portion to retain the original information as much as possible, enables the high-amplitude portion to be transformed into the information representation conforming to the human ear. As a result, the output of the acoustic model more meets the prediction requirements of the language model, complies with the improvement strategy proposed in one or more embodiments of the present disclosure, and improves the effect.

(10) The speech data within a target period is obtained; the target speech segment in the speech data is identified; and the target speech segment is deleted from the speech data to obtain the speech sample. Thus, the obtained speech sample has noise, and at each moment has audio, thereby effectively compressing the storage space of the speech data, effectively reducing the influence of invalid information on the training efficiency of the speech recognition model, and effectively improving the training efficiency of the speech recognition model.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A method for training a speech recognition model, the method comprising:

performing, by the speech recognition model, feature extraction on a speech sample to obtain a speech sample feature;

performing semantic extraction on the speech sample feature to obtain a semantic feature of the speech sample;

determining a first loss value based on the semantic feature;

performing, by the speech recognition model, speech recognition on the speech sample based on the speech sample feature to obtain a speech sample recognition result;

determining a second loss value based on the speech sample recognition result and a speech sample label corresponding to the speech sample; and training the speech recognition model based on the first loss value and the second loss value to obtain a trained speech recognition model;

wherein the speech sample feature comprises a plurality of sample sub-features; and the performing of the semantic extraction on the speech sample feature to obtain the semantic feature comprises:

determining one or more target sample sub-features of the sample sub-features by: for each of the sample sub-features, performing semantic recognition on the each of the sample sub-features to obtain a semantic recognition result and, in response to determining that the semantic recognition result indicates that the each of the sample sub-features has a semantic sub-feature, determining the each of the sample sub-features as one of the target sample sub-features; and in response to determining that the one or more target sample sub-features comprise only one target sample sub-feature, determining the semantic sub-feature of the one target sample sub-feature as the semantic feature; and in response to determining that the one or more target sample sub-features comprise a plurality of target sample sub-features, fusing respective semantic sub-features of the plurality of target sample sub-features to obtain the semantic feature.

2. The method of claim 1, further comprising: before performing the feature extraction on the speech sample, obtaining speech data in a target period;

performing speech segment recognition on the speech data to obtain a target speech segment of the speech data, the target speech segment having no audio or having noise; and deleting the target speech segment from the speech data to obtain the speech sample.

3. The method of claim 2, wherein the speech data comprises a plurality of speech segments respectively corresponding to a plurality of target moments within the target period; and the performing of the speech segment recognition on the speech data to obtain the target speech segment comprises, for each of the speech segments, one of:

in response to determining that the each of the speech segments has no audio, determining the each of the speech segments as the target speech segment; and in response to determining that the each of the speech segments has audio, performing noise recognition on the each of the speech segments to obtain a noise recognition result and, in response to determining that the noise recognition result indicates that the each of the speech segments has noise, determining the each of the speech segments as the target speech segment.

4. The method of claim 1, wherein the performing of the feature extraction on the speech sample to obtain the speech sample feature comprises:

performing speech signal processing on the speech sample to obtain frequency domain information of the speech sample; and performing, by the speech recognition model, the feature extraction on the speech sample based on the frequency domain information to obtain the speech sample feature.

5. A method for training a speech recognition model, the method comprising:

performing, by the speech recognition model, feature extraction on a speech sample to obtain a speech sample feature;

performing semantic extraction on the speech sample feature to obtain a semantic feature of the speech sample;

determining a first loss value based on the semantic feature;

performing, by the speech recognition model, speech recognition on the speech sample based on the speech sample feature to obtain a speech sample recognition result;

determining a second loss value based on the speech sample recognition result and a speech sample label corresponding to the speech sample; and training the speech recognition model based on the first loss value and the second loss value to obtain a trained speech recognition model;

wherein the method further comprises: before determining the first loss value based on the semantic feature, performing feature fusion on the semantic feature and the speech sample feature to obtain a fused feature.

6. The method of claim 5, wherein the determining of the first loss value based on the semantic feature comprises:

obtaining a semantic label feature corresponding to the speech sample;

determining a first similarity between the semantic label feature and the semantic feature; and determining the first loss value based on the fused feature and the first similarity.

7. The method of claim 6, wherein the determining of the first loss value based on the fused feature and the first similarity comprises:

performing feature extraction on the speech sample label to obtain a speech label feature;

performing feature fusion on the speech label feature and the semantic label feature to obtain a target label feature;

determining a second similarity between the target label feature and the fused feature; and determining the first loss value based on the first similarity and the second similarity.

8. The method of claim 5, wherein the determining of the first loss value based on the semantic feature comprises:

performing, by the speech recognition model, speech recognition on the speech sample based on the fused feature to obtain a first recognition result;

performing, by the speech recognition model, speech recognition on the speech sample based on the semantic feature to obtain a second recognition result; and determining the first loss value based on the first recognition result and the second recognition result.

9. The method of claim 8, wherein the determining of the first loss value based on the first recognition result and the second recognition result comprises:

determining a third similarity between the first recognition result and the speech sample label;

determining a fourth similarity between the second recognition result and the speech sample label; and determining the first loss value based on the third similarity and the fourth similarity.

10. A method for training a speech recognition model, the method comprising:

performing, by the speech recognition model, feature extraction on a speech sample to obtain a speech sample feature;

performing semantic extraction on the speech sample feature to obtain a semantic feature of the speech sample;

determining a first loss value based on the semantic feature;

performing, by the speech recognition model, speech recognition on the speech sample based on the speech sample feature to obtain a speech sample recognition result;

determining a second loss value based on the speech sample recognition result and a speech sample label corresponding to the speech sample; and training the speech recognition model based on the first loss value and the second loss value to obtain a trained speech recognition model;

wherein the determining of the second loss value based on the speech sample recognition result and the speech sample label comprises:

determining a fifth similarity between the speech sample recognition result and the speech sample label;

performing feature extraction on the speech sample label to obtain a speech label feature;

determining a sixth similarity between the speech label feature and the speech sample feature; and determining the second loss value based on the fifth similarity and the sixth similarity.

11. The method of claim 1, wherein the training of the speech recognition model based on the first loss value and the second loss value comprises:

obtaining a first weight corresponding to the first loss value and a second weight corresponding to the second loss value;

multiplying the first loss value by the first weight to obtain a first target loss value;

multiplying the second loss value by the second weight to obtain a second target loss value;

adding the first target loss value to the second target loss value to obtain a total target loss value; and training the speech recognition model based on the total target loss value.

12. A speech recognition method, comprising:

performing, by a trained speech recognition model, feature extraction on speech data to obtain a speech feature; and performing, by the trained speech recognition model, speech recognition on the speech data based on the speech feature to obtain a speech recognition result corresponding to the speech data, wherein the trained speech recognition model is obtained by the method of claim 1.

13. An electronic device, comprising:

a processor; and a memory storing instructions executable by the processor to perform the method of claim 1.

14. The electronic device of claim 13, wherein the operations further comprise: before performing the feature extraction on the speech sample, obtaining speech data in a target period;

performing speech segment recognition on the speech data to obtain a target speech segment of the speech data, the target speech segment having no audio or having noise; and deleting the target speech segment from the speech data to obtain the speech sample.

15. The electronic device of claim 14, wherein the speech data comprises a plurality of speech segments respectively corresponding to a plurality of target moments within the target period; and the performing of the speech segment recognition on the speech data to obtain the target speech segment comprises, for each of the speech segments, one of:

in response to determining that the each of the speech segments has no audio, determining the each of the speech segments as the target speech segment; and in response to determining that the each of the speech segments has audio, performing noise recognition on the each of the speech segments to obtain a noise recognition result and, in response to determining that the noise recognition result indicates that the each of the speech segments has noise, determining the each of the speech segments as the target speech segment.

16. The electronic device of claim 13, wherein the performing of the feature extraction on the speech sample to obtain the speech sample feature comprises:

performing speech signal processing on the speech sample to obtain frequency domain information of the speech sample; and performing, by the speech recognition model, the feature extraction on the speech sample based on the frequency domain information to obtain the speech sample feature.

17. An electronic device, comprising:

a processor; and a memory storing instructions executable by the processor to perform the speech recognition method of claim 12.

18. A non-transitory computer-readable storage medium storing instructions executable by a processor to perform the method of claim 1.

19. A non-transitory computer-readable storage medium storing instructions executable by a processor to perform the speech recognition method of claim 12.

* * * * *